May 9, 1961
J. C. NEUPAUER
2,983,825
ELECTRICAL CONTROL APPARATUS
Filed Aug. 13, 1959
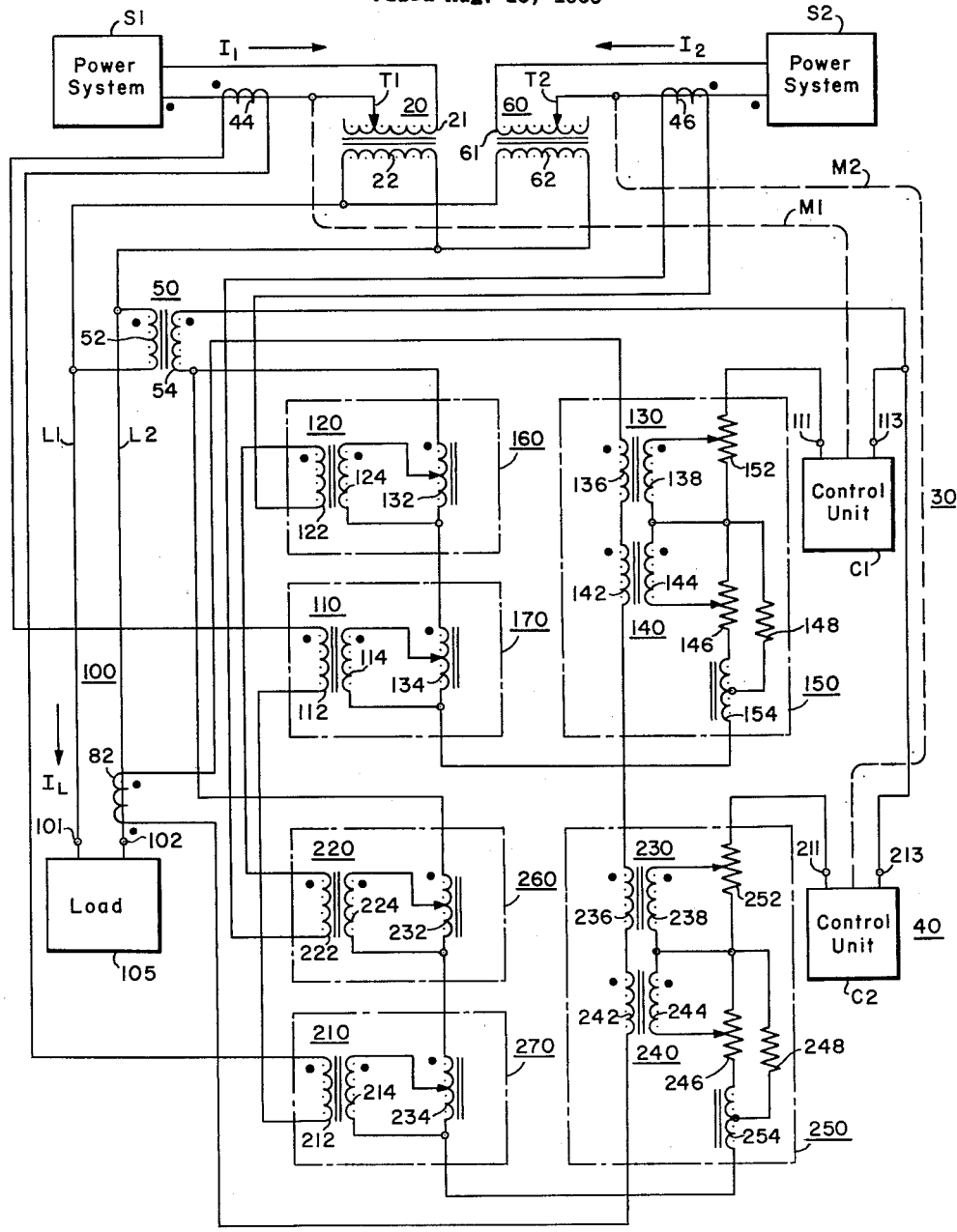
WITNESSES
Edwin C. Baisley
Clement L. McHale
INVENTOR
John C. Neupauer
BY F. E. Browder
ATTORNEY

United States Patent Office 2,983,825
Patented May 9, 1961

2,983,825

ELECTRICAL CONTROL APPARATUS

John C. Neupauer, Springfield, Ohio, assignor to Westinghouse Electric Corporation, East Pittsburgh, Pa., a corporation of Pennsylvania Filed Aug. 13, 1959, Ser. No. 833,602

11 Claims. (Cl. 307—53)

This invention relates to voltage regulating systems and, more particularly, to means for controlling the division of load among a plurality of such systems, such as tap changing transformer systems, having outputs connected to a common load circuit.

In certain types of electrical power systems, such as those including a plurality of voltage regulating systems connected between separate sources of electric power and a common load circuit, a problem arises in controlling the division of load currents, more specifically the reactive components of said load currents, among said sources of electric power. For example, one conventional voltage regulating system comprises a three winding tap changing transformer having two windings connected to separate sources of electric power and a third winding connected to a load circuit. In order to maintain the voltage at the load circuit at substantially a predetermined value, one commonly used arrangement employs a first tap changing means to select a tap on the load winding of said tap changing transformer, which is usually designed for a lower voltage than the other windings of said tap changing transformer, and a second tap changing means on one of the other windings of said tap changing transformer which is connected to one of the separate sources of electric power. The first tap changing means is automatically controlled in response to the voltage at the load circuit, which may be modified by the use of conventional line drop compensating means for the voltage drop in a portion of said load circuit between the point at which the voltage is sensed and some distant point at which the load may be concentrated. The second tap changing means which may be of the under-load type is usually manually, rather than automatically, controlled and is set to maintain the average division of reactive load current from the two sources of electric power connected to said tap changing transformer at substantially a predetermined average ratio. An important disadvantage of the latter arrangement is that it does not permit convenient control of the division of load current among a plurality of sources of electric power which are supplying load current to a common load circuit through separate associated voltage regulating means, such as tap changing transformer means, while maintaining the voltage at said load circuit at substantially a predetermined value. Another disadvantage of the latter arrangement is that the first tap changing means must be designed to handle a substantially higher load current since the load winding of the associated tap changing transformer is normally designed for a lower voltage than the other windings of said tap changing transformer.

Another arrangement of the type described, which has been employed in certain applications, comprises first and second tap changing means associated with the first and second high voltage windings of a single, three winding, tap changing transformer or with the separate high voltage windings of two separate tap changing transformers each having two windings. Assuming that two tap changing transformers are provided, each of said transformers including a first high voltage winding connected to a separate source of electric power and a second low voltage winding connected to a common load circuit, the first and second tap changing means associated with said high voltage windings would normally be controlled in response to the voltage at said load circuit which may be modified or reduced for the voltage drop in a portion of said load circuit which is measured by separate conventional line drop compensating means and the separate load currents being supplied by said first and second sources of electric power to said common load circuit. A disadvantage of the latter arrangement is that if one tap changer operates more quickly than the other in response to a change in the voltage at said load circuit, the source of electric power associated with the former tap changing means tends to supply a greater share of the load current to said load circuit. The latter operating condition may also be accelerated because of the manner in which a conventional line drop compensating means where applied further reduces the voltage to which the former tap changing means responds. On the other hand, a change in the load division as just described affects the other tap changing means to reduce the share of the load current being supplied by the associated source of electric power and to magnify or accelerate a change in the division of the load current between said sources thus producing a run-away operating condition in which the first and second tap changing means are driven to opposite extremes of their ranges of operation due to their differences in operating characteristics. The latter runaway condition can be overcome by use of conventional paralleling or shunt reactors which tend to make each tap changing transformer and its associated tap changing means shed reactive load. Even with the use of the latter reactors, however, it is not possible to maintain the voltage at the load circuit, as modified by the voltage drop in a portion of said load circuit, at substantially a predetermined value since the latter voltage will have a drooping characteristic as the load current increases due to the reactances of the tap changing transformers and the associated paralleling reactors. It is, therefore, desirable to provide an electric power system including a plurality of voltage regulating means connected between separate sources of electric power and a common load circuit in which the voltage at said load circuit may be maintained at substantially a predetermined value without a drooping characteristic and the division of load current among said sources of electric power may be conveniently and automatically controlled.

It is an object of this invention to provide a new and improved voltage regulating system.

Another object of this invention is to provide a new and improved means for controlling the division of load among a plurality of voltage regulating means connected between separate sources of electric power and a common load circuit.

A further object of this invention is to provide a means for maintaining the voltage at a load circuit being supplied electric power from separate sources of power through associated voltage regulating means at substantially a predetermined value without a drooping characteristic.

Other objects of the invention will, in part, be obvious and will, in part, appear hereinafter.

For a fuller understanding of the nature and objects of the invention, reference should be had to the following detailed description taken in connection with the accompanying drawing, in which the single figure diagrammatically illustrates one embodiment of this invention.

Referring now to the drawing, there is illustrated, in general, an electric power system including a plurality of voltage regulating means 30 and 40 connected between the separate sources of electric power S1 and S2, respectively, and the common load circuit 100. The first and second voltage regulating means 30 and 40, respectively, include the first and second tap changing transformers 20 and 60, respectively, and the associated first and second control units or means C1 and C2, respectively, for controlling the operation of said tap changing transformers in response to the voltage at the load circuit 100, as modified by the operation of the associated first and second line drop compensating means 150 and 250, respectively, and by the operation of the circuit means 160 and 170 and 260 and 270, respectively, whose purpose will be explained hereinafter.

In particular, the first and second tap changing transformers 20 and 60, respectively, include the primary or high voltage windings 21 and 61, respectively, which are connected to the separate power sources or systems S1 and S2, respectively, and the secondary or low voltage windings 22 and 62, respectively, which are connected in parallel circuit relationship to the common load circuit 100 which includes the load 105. It is to be understood that in certain applications, a three winding transformer may be substituted for the transformers 20 and 60, said three winding transformer having two input windings similar to the primary windings 21 and 61 of the transformers 20 and 60, respectively, and a single output or third winding which would be substituted on a common magnetic core for the secondary windings 22 and 62 of the first and second tap changing transformers 20 and 60, respectively. In order to vary the effective number of turns in the primary windings 21 and 61 or to select a tap setting on each of said primary windings, the primary windings 21 and 61 of the tap changing transformers 20 and 60, respectively, are provided with the tap changing mechanisms T1 and T2, respectively. The positions or settings of the first and second tap changing mechanisms T1 and T2 respectively, of the first and second tap changing transformers 20 and 60, respectively, are controlled through the first and second mechanical means M1 and M2, respectively, by the first and second control units or means C1 and C2, respectively, each of which includes a driving means (not shown), such as a motor, and a voltage responsive means or device (not shown), such as a voltage sensitive relay or a voltage sensitive magnetic or semiconductor device or means.

In order to render the first and second control units or means C1 and C2 respectively, of the first and second voltage regulating means 30 and 40, respectively, responsive to the voltage at the load circuit 100, the potential transformer 50 is connected in circuit relation between the load conductors L1 and L2, respectively, of the load circuit 100 and said first and second control units or means. In particular, the potential transformer 50 comprises a primary winding 52 which is connected across the load circuit load 100 at the load conductors L1 and L2 and also connected across the output of the parallel connected secondary windings 22 and 62 of the first and second tap changing transformers 20 and 60, respectively, and a secondary winding 54. The upper end of the secondary winding 54 of the potential transformer 50 is connected to the input terminal 113 of the first control unit or means C1 and also to the input terminal 213 of the second control unit or means C2. The lower end of the secondary winding 54 of the potential transformer 50 is connected to the other input terminal 111 of the first control unit or means C1 through the effective impedances of each of the circuit means 160 and 170 and the line drop compensating means 150, which are effectively connected in series circuit relation with each other. Similarly, the lower end of the secondary winding 54 of the potential transformer 50 is connected to the input terminal 211 of the second control unit or means C2 through the effective impedances of each of the circuit means 260 and 270 and the line drop compensating means 250, which are effectively connected in series circuit relationship with one another. In general, the voltage applied to the input terminals 111 and 113 of the first control unit or means C1 and to the input terminals 211 and 213 of the second control unit or means C2 varies with the voltage of the load circuit 100 at the load conductors L1 and L2, as modified by the voltages across the associated first and second line drop compensating means 150 and 250, respectively, and by the voltage across the circuit means 160 and 170 and 260 and 270, respectively, as will be described in detail hereinafter. In other words, the voltage applied at the input terminals 111 and 113 of the first control unit or means C1 and the voltage applied at the input terminals 211 and 213 of the second control unit or means C2 are substantially equal to the vector sums of the voltage across the secondary winding 54 of the potential transformer 50, the voltages across the associated line drop compensating means 150 and 250, respectively, and the voltages across the associated circuit means 160 and 170 and 260 and 270, respectively.

The first and second line drop compensating means 150 and 250, respectively, are connected in circuit relation between between the load circuit 100 and the associated first and second control units or means C1 and C2, respectively, for producing a compensating voltage which varies with the voltage drop in the portion of said load circuit between the load 105 and the point at which the primary winding 52 of the potential transformer 50 is connected. In general, the first and second line drop compensating means 150 and 250, respectively, each includes a resistive component and a reactive component which correspond to the resistance and to the reactance, respectively, of the load circuit 100 between the load 105 and the point at which the potential transformer 50 is connected, and means for circulating therethrough a current which varies with the load current flowing in the load circuit 100. The resistive component of the first line drop compensating means 150 comprises a potentiometer 152, the upper end of said potentiometer being connected to the input terminal 111 of the associated first control unit or means C1 and the resistive component of the second line drop compensating means 250 similarly comprises a potentiometer 252, the upper end of said potentiometer being connected to the input terminal 211 of the second control unit or means C2. The reactive components of the first and second line drop compensating circuits 150 and 250, respectively, are of the general type which is disclosed in greater detail in copending application Serial No. 644,557, now Patent No. 2,961,597, filed March 7, 1957, by J. T. Carleton and assigned to the same assignee as the present application. Briefly, the reactive component of the first line drop compensating means 150 comprises a potentiometer 146 and a tapped reactor 154 which are connected in series circuit relationship with one another and with the potentiometer 152 between the lower end of the potentiometer 152 and the circuit means 170 and a resistor 148 which is connected between the common terminal between the potentiometers 152 and 146 and the tap connection of the reactor 154, the resistor 148 being connected in parallel circuit relationship with the potentiometer 146 and the upper portion of the tapped reactor 154. Similarly, the reactive component of the second line drop compensating means 250 comprises a potentiometer 246 and a tapped reactor 254 which are connected in series circuit relationship with one another and with the potentiometer 252 between the lower end of the potentiometer 252 and the circuit means 270 and a resistor 248 which is connected between the common terminal between the potentiometers 252 and 246 and the tapped connection of the reactor 254, the resistor 248 being connected in parallel circuit relationship with the potentiometer 246 and the upper portion of the tapped reactor 254.

In order to circulate a current through the components of the first and second line drop compensating means 150 and 250 respectively, the current transformer 82 is disposed in inductive relationship with the load conductor L2 and the output current of said current transformer varies with or is proportional to the load current flowing in the load circuit 100. In order to apply the output current of the current transformer 82 to the components of the first and second line drop compensating means 150 and 250 respectively, the first and second line drop compensating means 150 and 250, respectively, include the isolating and matching current transformers 130 and 140 and 230 and 240, respectively. In particular, the isolating current transformers 130, 140, 230, and 240 include the primary windings 136, 142, 236, and 242, respectively, which are connected in series circuit relationship with one another, the series circuit being connected across the output of the current transformer 82. The current transformers 130 and 230 of the first and second line drop compensating means 150 and 250, respectively, also include the secondary windings 138 and 238, respectively, which are connected across the lower portions of the associated potentiometers 152 and 252, respectively, between the arms of the respective potentiometers and the common terminals between the potentiometers 152 and 146 and 252 and 246, respectively, to circulate therethrough a current which varies with the load current flowing in the load circuit 100 and to produce across the lower portion of each of the associated respective potentiometers a voltage which is substantially in phase with said load current. The current transformers 140 and 240 of the first and second line drop compensating means 150 and 250, respectively, also include the secondary windings 144 and 244, respectively, which are connected across the upper portions of the potentiometers 146 and 246, respectively, between the common terminals between the potentiometers 152 and 146 and 252 and 246, respectively, and the arms of the potentiometers 146 and 246, respectively, to circulate through the reactive components of the first and second line drop compensating means 150 and 250, respectively, a current which varies with the load current flowing in the load circuit 100. As explained in greater detail in the copending application previously mentioned, the current which is applied to each of the reactive components of the first and second line drop compensating means 150 and 250, respectively, in the manner just described, produces across each of said reactive components a voltage which is substantially 90 degrees out of phase with the load current flowing in the load circuit 100 and which is continuously variable by the setting of the arms of the potentiometers 146 and 246, respectively.

In the operation of the first and second line drop compensating means 150 and 250, respectively, the resistances of the potentiometers 152 and 252, respectively, are adjusted to be proportional to the resistance of the load circuit 100 between the load 105 and the point at which the potential transformer 50 is connected to said load circuit. Therefore, when a current proportional to the load current of the load circuit 100 is circulated through the selected portions of the potentiometers 152 and 252, the resistive components of the line drop compensating voltages are proportional to the resistive or in-phase component of the voltage drop in the load circuit 100 between the load 105 and the point at which the potential transformer 50 is connected to the said load circuit.

In the operation of the reactive components of the first and second line drop compensating means 150 and 250, respectively, it has been found as described in greater detail in the copending application previously mentioned that by properly proportioning the values of the potentiometers, the resistors and the tapped reactors of said reactive components, the output voltages of said reactive components appearing between the upper ends of the potentiometers 146 and 246, respectively, and the lower ends of the tapped reactors 154 and 254, respectively, are substantially 90 degrees out of phase with the load current flowing in the load circuit 100 and, as previously mentioned, is continuously variable by the settings of the potentiometers 146 and 246, respectively. The output voltages of the reactive components of the first and second line drop compensating means 150 and 250, respectively, may be adjusted by the settings of the potentiometers 146 and 246, respectively, to be proportional to the reactive component of the voltage drop in the load circuit 100 between the load 105 and the point at which the potential transformer 50 is connected to the said load circuit.

The vector sums of the voltages across the components of each of the first and second line drop compensating means 150 and 250, respectively, therefore, varies with the total voltage drop across the effective impedance of the load circuit between the load 100 and the point at which the potential transformer 50 is connected to said load circuit. Since the first and second line drop compensating means 150 and 250, respectively, are each effectively connected in series circuit relationship between the secondary winding 54 of the potential transformer 50 and the input terminals 111 and 211, respectively, of the associated control units or means C1 and C2, respectively, of the first and second voltage regulating means 30 and 40, respectively, to reduce the voltage applied at the input terminals of said control units by the effective voltage drops across said line drop compensating means, said control units respond to the voltage at the load terminals 101 and 102 of the load circuit 100 rather than to the voltage in said load circuit at the point where the potential transformer 50 is connected to the load conductors L1 and L2 of said load circuit.

The first circuit means 160 and 170 and the second circuit means 260 and 270 are connected in circuit relationship with the associated first and second line drop compensating means 150 and 250, respectively, for controlling the division of reactive load currents being supplied by the first and second power systems or sources S1 and S2 respectively, to the load circuit 100 and for maintaining the ratio of the reactive load currents being supplied by said first and second power sources at substantially a predetermined value. The first circuit means 160 and 170 of the first voltage regulating means 30 include a pair of first and second variable reactors or autotransformers 132 and 134, respectively, which are connected in series circuit relationship with one another, the series circuit being connected between the lower end of the secondary winding 54 of the potential transformer 50 and the associated first line drop compensating means 150 which, in turn, is effectively connected in series circuit relation between said reactors and the input terminal 111 of the first control unit or means C1. Similarly, the second circuit means 260 and 270 include a pair of first and second variable reactors or autotransformers 232 and 234 which are connected in series circuit relationship with one another, the series circuit being connected between the lower end of the secondary winding 54 of the potential transformer 50 and the associated second line drop compensating means 250 which, in turn, is connected effectively in series circuit relationship between said reactors and the input terminal 211 of the associated second control unit or means C2.

In order to circulate a current through the first reactors 120 and 220 of the first and second circuit means 160 and 260, respectively, which varies with the current supplied from the second source S2 to the load circuit 100, the current transformer 46 is disposed in inductive relationship with the lower output conductor from the power system or source S2 between said source and the primary winding 61 of the tap changing transformer 60, and produces at the output thereof a current which varies with or is proportional to the load current $I_2$ being supplied from the second power system or source S2 to the load circuit 100. The first and second circuit means 160 and 260, respectively, include the isolating and matching current transformers 120 and 220, respectively, each having the primary windings 122 and 222, respectively, which are connected in series circuit relationship with one another, the series circuit being connected across the output of the current transformer 46. The isolating current transformers 120 and 220 of the first and second circuit means 160 and 260, respectively, also include the secondary windings 124 and 224, respectively, which are connected across the lower portions of the associated variable reactors 132 and 232, respectively, between the arms of said reactors and the common terminals between the reactors 132 and 134 and 232 and 234, respectively. Similarly, in order to circulate a current through the second reactors 110 and 210 of the first and second circuit means 170 and 270, respectively, which varies with the current supplied from the first source S1 to the load circuit 100, the current transformer 44 is disposed in inductive relationship with the lower output conductor from the first power system or source S1 between said source and the primary winding of the tap changing transformer 20 and produces at its output a current which varies with or is proportional to the load current $I_1$ which the first power system or source S1 is supplying to the load circuit 100. The first and second circuit means 170 and 270, respectively, also include the isolating and matching current transformers 110 and 210, respectively, having the primary windings 112 and 212, respectively, which are connected in series circuit relationship with one another, the series circuit being connected across the output of the current transformer 44. The current transformers 110 and 210 of the first and second circuit means 170 and 270, respectively, also include the secondary windings 114 and 214, respectively, which are connected across the lower portions of the associated variable reactors 134 and 234, respectively, between the arms of said reactors and the common terminal between the reactor 134 and the associated first line drop compensating means 150 and the common terminal between the reactor 234 and the second line drop compensating means 250, respectively, and as just mentioned, circulates through said reactors a current which varies with the load current $I_1$ being supplied by the first power system or source S1 to the load circuit 100. The values of the first and second reactors 132 and 134 of the first circuit means 160 and 170, respectively, are adjusted or proportioned substantially inversely to the desired ratio of the reactive components of the load currents $I_2$ and $I_1$ being supplied to the load circuit 100 from the second and first power systems or sources S2 and S1, respectively, the measures of said load currents being circulated through the respective reactors as previously described. Similarly, the values of the first and second reactors 220 and 210 of the second circuit means 260 and 270, respectively, are also adjusted or proportioned substantially inversely to the desired ratio of the reactive components of the load currents $I_2$ and $I_1$ being supplied from the second and first power systems or sources S2 and S1, respectively, to the load circuit 100, the measure of said load currents being circulated through the respective reactors as previously described and for reasons which will be discussed hereinafter.

In summary, it should be noted that the currents circulated through the first reactors 132 and 232 of the first and second circuit means 160 and 260, respectively, as well as the corresponding voltages produced across said reactors, vary with the load current $I_2$ being supplied to the load circuit 100 from the second power source S2 and that the currents circulated through the second reactors 134 and 234 of the first and second circuit means 170 and 270, respectively, as well as the corresponding voltages produced across said reactors, vary with the load current $I_1$ being supplied to the load circuit 100 from the first power source S1. In addition, it should also be noted that because of the manner in which the current transformers 46, 120, and 110 are connected in circuit relation with the first and second reactors 132 and 134 of the first circuit means 160 and 170, respectively, the voltages across said reactors are opposing and because of the manner in which the current transformers 46, 220, and 210 are connected in circuit relation with the first and second reactors 232 and 234, respectively, of the second circuit means 260 and 270, respectively, the voltages across the latter pair of reactors are also opposing with respect to each other, for reasons which will be explained hereinafter.

The overall operation of the electric power system shown in the drawing can best be understood by considering the voltages $V_1$ and $V_2$ applied at the input terminals of the first and second control units or means C1 and C2, respectively, of the first and second voltage regulating means 30 and 40, respectively, which can be expressed by the following vector equations:

(1) $\quad V_1 = V_L - I_L Z_C + (I_1 X_1 - I_2 X_2)$
(2) $\quad V_2 = V_L - I_L Z_C - (I_1 X_1 - I_2 X_2)$ The following terminology is employed in the above equations:

$V_L$ = the voltage of the load circuit 100 at the point where the primary winding 52 of the potential transformer 50 is connected to said load circuit.

$I_L$ = the total load current being supplied to the load circuit 100 from the first and second power sources S1 and S2, respectively.

$Z_C$ = the total effective impedance of each of the first and second line drop compensating means 150 and 250, respectively.

$X_1$ = the reactance of each of the second reactors 134 and 234 of the first and second circuit means 170 and 270, respectively.

$X_2$ = the reactance of each of the first reactors 132 and 232 of the first and second circuit means 160 and 260, respectively.

It should be noted from the Equations 1 and 2 that the voltage across each of the first and second line drop compensating means 150 and 250, respectively, as represented by the second term of each of said equations which varies with the total load current $I_L$ supplied to the load 100 by the first and second power systems or sources S1 and S2, respectively, is vectorially opposing with respect to the voltage of said load circuit as sensed by the potential transformer 50 and therefore reduces the net voltage which is applied at the input terminals of each of the first and second control units or means C1 and C2, respectively. The vector difference between the first two terms of each of the Equations 1 and 2 represents the voltage of the load circuit at the load 100 or at the load terminals 101 and 102 since the voltage $V_L$ corresponds to the voltage sensed by the potential transformer 50 at the point where said potential transformer is connected to said load circuit and the term $I_L Z_C$ represents the voltage drop across each of the first and second line drop compensating means 150 and 250, respectively, which corresponds to the voltage drop in the load circuit 100 between the load 105 and the point at which the potential transformer 50 is connected to said load circuit.

It should also be noted from the Equations 1 and 2 that the net or total voltage across the first and second reactors 132 and 134, respectively, of the first circuit means 160 and 170, respectively, as represented by the last term of Equation 1 is vectorially additive and the net or total voltage across the first and second reactors 232 and 234, respectively, of the second circuit means 260 and 270, respectively, as represented by the last term of the Equation 2, is vectorially opposing with respect to the voltage $V_L$ of the load circuit 100, as sensed by the potential transformer 50. The values of the last terms of the Equations 1 and 2 will depend upon the division of load current being supplied to the load 100 by the first and second power sources S1 or S2, respectively, or upon the ratio of the load currents $I_1$ and $I_2$ being supplied by said first and second power sources, respectively, and more predominantly or to a much greater degree with the ratio of the reactive components of the load currents $I_1$ and $I_2$ because of the phase relationships existing between the currents circulated through the corresponding reactors 134 and 234 and 132 and 232, respectively, and the corresponding voltages produced thereby across said reactors. Since the values of the reactances of the reactors 134 and 234 and 132 and 232 as represented by $X_1$ and $X_2$, respectively, are proportioned substantially inversely to the desired ratio of the reactive components of the load currents $I_1$ and $I_2$ being supplied to the load 100 by the first and second power sources S1 and S2, respectively, the last term of each of the Equations 1 and 2 will be substantially equal to zero when the desired division of load current between said first and second sources of power is present in the overall electric power system shown in the drawing as expressed by the following equations:

(3) $\qquad 0 = I_1 X_1 - I_2 X_2$
(4) $\qquad 0 = I_1 X_1 - I_2 X_2$

In general, the first and second control units or means C1 and C2 of the first and second voltage regulating means 30 and 40, respectively, are arranged to control the operation of the associated tap changing transformers 20 and 60, respectively, as well as the first and second tap changing mechanisms T1 and T2, respectively, so as to maintain the respective input voltages $V_1$ and $V_2$ applied at the respective input terminals at substantially predetermined values. From an inspection of the Equations 1 and 2, it is clear that the input voltages $V_1$ and $V_2$ applied at the input terminals of the first and second control units or means C1 and C2, respectively, vary with the voltage $V_L$ of the load circuit 100 as sensed by the potential transformer 50, with the total load current $I_L$ being supplied to the load 100 from the first and second power sources S1 and S2, respectively, and with the division of the load currents $I_1$ and $I_2$ being supplied to the load circuit 100 from the first and second power sources S1 and S2, respectively.

It will be assumed first that the division of the reactive components of the load currents $I_1$ and $I_2$ being supplied from the first and second power sources S1 and S2, is substantially at the desired ratio and therefore the last terms of the Equations 1 and 2 as expressed by the Equations 3 and 4, respectively, are substantially negligible or equal to zero. When the division of the reactive components of the load currents $I_1$ and $I_2$ is substantially at the desired ratio, the voltages $V_1$ and $V_2$ applied at the input terminals of the first and second control units or means C1 and C2, respectively, correspond to the voltage at the terminals 101 and 102 of the load circuit 100. Under the assumed operating condition, if the voltages $V_1$ and $V_2$ applied at the input terminals of the first and second control means C1 and C2, respectively, should increase or decrease with respect to the desired predetermined values at said input terminals because of a change in the voltage $V_L$ sensed by the potential transformer 50 or because of a change in the load current $I_L$ being supplied to the load 100 by the first and second power sources S1 and S2, respectively, then the first and second control units C1 and C2, respectively, will cause the tap settings selected by the associated first and second tap changing mechanisms T1 and T2, respectively, to change on the associated first and second tap changing transformers 20 and 60, respectively, to either increase or decrease the voltage $V_L$ sensed by the potential transformer 50 at the output of said first and second tap changing transformers to thereby restore the voltage at the terminals 101 and 102 of the load circuit 100 and the corresponding voltages $V_1$ and $V_2$ at the input terminals of each of said first and second control units to substantially the desired predetermined values. For example, if the load current $I_L$ should increase to thereby decrease the input voltages $V_1$ and $V_2$ at the input terminals of the first and second control means C1 and C2, respectively, said first and second control means will cause the tap settings selected by the associated first and second tap changing means T1 and T2, respectively, to change so as to increase the output voltage at the output of said first and second tap changing transformers 20 and 60, respectively, as sensed by the potential transformer 50, to increase until the voltages $V_1$ and $V_2$ at the input terminals of said first and second control units, respectively, are increased to the desired predetermined values.

If it is assumed that, after the first and second control means C1 and C2, respectively, have operated to maintain the voltage at the load 100 at substantially a predetermined value, as well as the corresponding voltages $V_1$ and $V_2$, respectively, at the input terminals of each of said first and second control means, the first power source or system S1 is supplying a load current $I_1$ which is of a value larger than that necessary to maintain the desired ratio of the reactive components of the load currents $I_1$ and $I_2$ being supplied from the first and second power sources S1 and S2, respectively, at the desired value then the last term of each of the Equations 1 and 2 will not be negligible or substantially equal to zero. Since the first power source S1 is attempting to supply a larger share of the total load current $I_L$ than desired, the quantity $I_1 X_1$ will be greater than the quantity $I_2 X_2$, thus increasing the net input voltage $V_1$ applied to the input terminals of the first control means C1 and decreasing the input voltage $V_2$ applied to the input terminals of the second control means C2 with respect to the desired predetermined voltages required at the input terminals of said first and second control means, as indicated in the Equations 1 and 2, respectively. The latter increase in the input voltage $V_1$ applied at the input terminals of the first control means C1 will cause said control means to change the setting of the first tap changing mechanism T1 on the tap changing transformer 20 in such a direction as to decrease the load current $I_1$ being supplied from the first power source S1 and the corresponding decrease in the input voltage $V_2$ applied at the input terminals of the second control means C2 will cause the latter control means to change the setting of the tap changing mechanism T2 on the second tap changing transformer 60 in such a direction as to increase the load current $I_2$ being supplied to the load circuit 100 from the second power system or source S2 until the ratio of the reactive components of the load currents $I_1$ and $I_2$ being supplied from the first and second power sources S1 and S2, respectively, is restored to substantially the predetermined desired value. The simultaneous operation of the first and second control means C1 and C2, respectively, as just described, in effectively opposite directions will quickly reduce the net voltages across each of the pairs of reactors 132 and 134 and 232 and 234 of the first and second circuit means 160 and 170 and 260 and 270 respectively, to negligible values, as represented by the last terms of the Equations 1 and 2, to establish an equilibrium in the overall electric power system without the possibility of causing a runaway condition in the operation of the associated first and second tap changing transformers 20 and 60, respectively.

On the other hand, if it is assumed that, after the first and second control means C1 and C2 and the associated first and second tap changing transformers 20 and 60, respectively, have operated to maintain the voltage across the load 100 at the terminals 101 and 102 at substantially a desired predetermined value, the second power source or system S2 attempts to supply a load current $I_2$ which is of a value larger than that necessary to maintain the desired ratio of the reactive components of the load currents $I_1$ and $I_2$ being supplied from the first and second power sources S1 and S2, respectively, to the common load circuit 100, then the quantity $I_2X_2$ will become greater or exceed the quantity $I_1X_1$ thus reversing the polarity of the last term of each of the Equations 1 and 2 from the operating condition just described and decreasing the input voltage $V_1$ applied at the input terminals of the first control means C1 and increasing the input voltage $V_2$ applied at the input terminals of the second control means C2, with respect to the desired predetermined input voltages at the input terminals of said first and second control means. A change in the input voltage $V_1$ at the input terminals of the first control unit C1 below the desired predetermined value will cause the first control unit C1 to actuate the associated first tap changing mechanism T1 on the first tap changing transformer 20 in such a direction as to increase the load current $I_1$ being supplied by the first power source S1 to the load circuit 100 and a change in the input voltage $V_2$ applied to the input terminals of the second control means C2 above the desired predetermined value will cause the second control means C2 to actuate the associated second tap changing mechanism T2 to change the tap setting on the associated second tap changing transformer 60 in such a direction as to decrease the load current $I_2$ being supplied by the second power source S2 to the load circuit 100 while still maintaining the voltage at the terminals 101 and 102 of the load 100 at substantially the desired predetermined value. Similarly, the simultaneous operation of the first and second control means C1 and C2 in the manner just described will reduce the last term of each of the Equations 1 and 2 to a negligible value and again establish an equilibrium operating condition in the overall electric power system in which the desired ratio of the reactive components of load currents $I_1$ and $I_2$ being supplied from the first and second power sources S1 and S2, respectively, to the load circuit 100 is maintained at substantially a predetermined vlaue without resulting in a run-away operating condition.

It is important to note that the net voltage across the first circuit means 160 and 170 is either vectorially additive or opposing with respect to the voltage $V_L$ sensed by the potential transformer 50 and that the net voltage across the second circuit means 260 and 270 is vectorially of the opposite sense with respect to the later voltage whenever the ratio of the reactive components of the load currents $I_1$ and $I_2$ deviates from the desired predetermined value to thereby prevent a run-away operating condition of the regulating means 30 and 40 which would ordinarily result in conventional voltage regulating systems of the type previously mentioned. It should also be noted that the desired ratio of the reactive components of the load currents $I_1$ and $I_2$ being supplied from the first and second power sources S1 and S2, respectively, may be adjusted by the settings of the reactors 132, 134, 232 and 234 to obtain any desired ratio of the reactive components of the load currents $I_1$ and $I_2$ being supplied by said first and second power sources S1 and S2, respectively, and that the reactive component of the associated load current being supplied from either of said power sources may be reduced to a negligible value by the use of the circuits and apparatus as disclosed. After the initial settings of the reactors 132, 134, 232, 234 have been made, the desired ratio of the reactive components of the load currents $I_1$ and $I_2$ being supplied by the first and second power sources S1 and S2, respectively, will be maintained automatically in the manner previously described.

It is to be understood that a plurality of voltage regulating systems of the type described may be employed in polyphase electric power systems rather than in single phase electric power systems of the type used to illustrate the invention. It is also to be understood that other types of conventional voltage regulating systems, such as those of the induction regulator type, may be substituted for the tap changing transformer means as disclosed in accordance with the teachings of this invention. Finally, it is to be understood that in an electric power system as disclosed, the direction of the reactive component of the load current flowing between one of the power sources and the associated load circuit may be reversed in a particular application in order to maintain a predetermined ratio of the reactive components of the load currents $I_1$ and $I_2$ to provide power flow between one of the first and second power sources to the other of said sources.

The apparatus embodying the teachings of this invention has several advantages. For example, the voltage of a load circuit which is connected to the outputs of a plurality of voltage regulating means whose inputs are connected to separate sources of electric power can be maintained at substantially a predetermined value without a drooping characteristic and while simultaneously maintaining the ratio of the load currents, more specifically the reactive components of said load currents, being supplied by the respective sources at substantially a predetermined value. In addition, the latter mode of operation can be accomplished without producing a runaway condition in the operation of a plurality of voltage regulating means included in an electrical power system as disclosed.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In an electric power system, first and second voltage regulating means having inputs connected to separate sources of power and having outputs connected to a common load circuit, separate control means for each of said regulating means for controlling the operation thereof in response to the voltage of said load circuit, separate line drop compensating means connected in circuit relation between said load circuit and each of said control means for modifying the voltage to which the respective control means responds in accordance with the voltage drop in a portion of said load circuit, and means connected in circuit relation with each of said line drop compensating means and the associated control means for maintaining the ratio of the reactive load currents supplied from said first and second sources to said load circuit at substantially a predetermined value, said means including a plurality of autotransformers and means for circulating through said autotransformers currents which vary with said load currents.

2. In an electric power system, first and second tap changing transformer means having inputs connected to separate sources of power and having outputs connected to a common load circuit, separate control means for each of said tap changing means for controlling the operation thereof in response to the voltage of said load circuit, separate line drop compensating means connected in circuit relation between said load circuit and each of said control means for modifying the voltage to which the respective control means responds in accordance with the voltage drop in a portion of said load circuit, reactor means connected in circuit relation with each of said line drop compensating means and the associated control means for maintaining the ratio of the reactive load currents supplied from said first and second sources to said load circuit at substantially a predetermined value without a drooping characteristic, the values of said reactor means being proportioned inversely to said ratio, and means for circulating currents through said reactor means which vary with said load currents.

3. In an electric power system, first and second voltage regulating means having inputs connected to separate sources of power and having outputs connected to a common load circuit, separate control means for each of said regulating means for controlling the operation thereof in response to the voltage of said load circuit, separate line drop compensating means connected in circuit relation between said load circuit and each of said control means for modifying the voltage to which the respective control means responds in accordance with the voltage drop in a portion of said load circuit, and means connected in circuit relation with each of said line drop compensating means and the associated control means for maintaining the ratio of the reactive load currents supplied from said first and second sources to said load circuit at substantially a predetermined value, the last-mentioned means comprising separate pairs of first and second reactances connected in series circuit relation with each of said line drop compensating means between said load circuit and said control means and means for circulating through said first and second reactances of each pair currents which vary with the load currents supplied from said first and second sources, respectively, to said load circuit to produce corresponding opposing voltages across the reactances of each pair, the values of said reactances of each pair being proportioned substantially inversely to said predetermined ratio, the differences between the voltages across the reactances of said pairs adding to and subtracting from, respectively, the voltages to which the control means of said first and second regulating means respond.

4. In an electric power system, first and second tap changing transformer means having inputs connected to separate sources of power and having outputs connected to a common load circuit, separate control means for each of said tap changing means for controlling the operation thereof in response to the voltage of said load circuit, separate line drop compensating means connected in circuit relation between said load circuit and each of said control means for modifying the voltage to which the respective control means responds in accordance with the voltage drop in a portion of said load circuit, and means connected in circuit relation with each of said line drop compensating means and the associated control means for maintaining the ratio of the reactive load currents supplied from said first and second sources to said load circuit at substantially a predetermined value, the last-mentioned means comprising separate pairs of first and second reactances connected in series circuit relation with each of said line drop compensating means between said load circuit and said control means and means for circulating through said first and second reactances of each pair currents which vary with the load currents supplied from said first and second sources, respectively, to said load circuit to produce corresponding opposing voltages across the reactances of each pair, the values of said reactances of each pair being proportioned substantially inversely to said predetermined ratio, the differences between the voltages across the reactances of said pairs adding to and subtracting from, respectively, the voltages to which the control means of said first and second tap changing means respond.

5. In an electrical control system for maintaining the ratio of reactive load currents supplied from first and second sources of alternating current to a common load circuit at substantially a predetermined value, the combination comprising, first and second voltage regulating means each including voltage responsive means connected in circuit relation between said first and second sources, respectively, and said load circuit, means connected in circuit relation between said load circuit and said voltage responsive means for applying thereto a measure of the voltage of said load circuit, first and second line drop compensating means including means for obtaining a measure of the current in said load circuit connected in circuit relation between the voltage measuring means and said voltage responsive means for modifying the voltages applied thereto in accordance with the voltage drop in a portion of said load circuit, first and second pairs of first and second reactances connected in series circuit relation with said line drop compensating means between said voltage measuring means and the voltage responsive means of said first and second regulating means, the values of said reactances being proportioned substantially inversely to said predetermined ratio of reactive load currents, and means for circulating through each pair of said first and second reactances currents which vary with the load currents from said first and second sources and for producing corresponding opposing voltages across the reactances of each pair, respectively, the difference between the voltages across the reactances of said first and second pairs being additive and subtractive, respectively, with respect to the voltages applied to the voltage responsive means of said first and second regulating means, respectively.

6. In an electrical control system for maintaining the ratio of reactive load currents supplied from first and second sources of alternating current to a common load circuit at substantially a predetermined value, the combination comprising, first and second transformer tap changing means each including voltage responsive means connected in circuit relation between said first and second sources, respectively, and said load circuit, means connected in circuit relation between said load circuit and said voltage responsive means for applying thereto a measure of the voltage of said load circuit, first and second line drop compensating means including means for obtaining a measure of the current in said load circuit, said compensating means being connected in circuit relation between the voltage measuring means and said voltage responsive means for modifying the voltages applied thereto in accordance with the voltage drop in a portion of said load circuit, first and second pairs of first and second reactances connected in series circuit relation with said line drop compensating means between said voltage measuring means and the voltage responsive means of said first and second tap changing means, the values of said reactances being proportioned substantially inversely to said predetermined ratio of reactive load currents, and means for circulating through each pair of said first and second reactances currents which vary with the load currents from said first and second sources, and for producing corresponding opposing voltages across the reactances of each pair, respectively, the differences between the voltages across the reactances of said first and second pairs being additive and substractive, respectively, with respect to the voltages applied to the voltage responsive means of said first and second tap changing means, respectively.

7. In an electric power system, first and second voltage regulating means connected between separate sources of power and a common load circuit, separate control means for each of said regulating means for varying the output voltage of their respective regulating means in response to the voltage of said load circuit, separate line drop compensating means for each of said control means connected between said load circuit and their respective control means for modifying the voltage to which each control means responds in accordance with the voltage drop in a portion of said load circuit as the load current varies, separate pairs of reactances connected in circuit relation with each line drop compensating means and the associated control means, each of said pairs including a reactance associated with each of said sources with the values of said reactances being proportioned substantially inversely to a predetermined ratio of reactive load currents supplied from the respective sources to said load circuit, and means for circulating through each reactance a current proportional to the load current from the associated source to produce opposing corresponding voltages across the reactances of each pair, the differences between the voltages across each pair of reactances being additive and subtractive with respect to the voltages to which the respective control means respond to maintain the ratio of the reactive load currents supplied from the respective sources to said load circuit at substantially said predetermined value.

8. In an electric power system, first and second tap changing transformer means connected between separate sources of power and a common load circuit, separate control means for each of said regulating means for varying the output voltage of their respective tap changing means in response to the voltage of said load circuit, separate line drop compensating means for each of said control means connected between said load circuit and their respective control means for modifying the voltage to which each control means responds in accordance with the voltage drop in a portion of said load circuit as the load current varies, separate pairs of reactances connected in circuit relation with each line drop compensating means and the associated control means, each of said pairs including a reactance associated with each of said sources, the values of said reactances being proportioned substantially inversely to a predetermined ratio of reactive load currents supplied from the respective sources to said load circuit, and means for circulating through each reactance a current proportional to the load current from the associated source to produce opposing corresponding voltages across the reactances of each pair, the differences between the voltages across each pair of reactances being additive and subtractive, respectively, with respect to the voltages to which the respective control means respond to maintain the ratio of the reactive load currents supplied from the respective sources to said load circuit at substantially a predetermined value.

9. In an electrical control system for maintaining the ratio of reactive power supplied from first and second sources of alternating current voltage to a common load circuit at substantially a predetermined value, the combination comprising, first and second voltage regulating means connected between said first and second sources, respectively, and said common load circuit, first means connected in circuit relation with said load circuit for obtaining a measure of the load circuit voltage, first and second voltage responsive means connected in circuit relation between said voltage measuring means and said first and second regulating means, respectively, for controlling the operation of said regulating means in response to the voltage of said load circuit, second and third means connected in circuit relation with said first and second sources, respectively, for obtaining a measure of the first and second load currents, respectively, flowing from said sources to said load circuit, and a pair of first and second reactances connected in circuit relation between each of said first and second voltage responsive means and said voltage measuring means, the values of said first and second reactances being proportioned substantially inversely to the desired ratio of reactive load currents supplied from said first and second sources, respectively, said second and third means being connected in circuit relation with each of said first and second reactances, respectively, for circulating currents therethrough and for producing corresponding opposing voltages across the reactances of each pair which vary with said first and second load currents, respectively, the differences between the voltages across each pair of reactances being additive and subtractive, respectively, with respect to the voltages applied to said first and second voltage responsive means, respectively.

10. In an electrical control system for maintaining the ratio of reactive power supplied from first and second sources of alternating current voltage to a common load circuit at substantially a predetermined value, the combination comprising, first and second tap changing transformer means connected between said first and second sources, respectively, and said common load circuit, first means connected in circuit relation with said load circuit for obtaining a measure of the load circuit voltage, first and second voltage responsive means connected in circuit relation between said voltage measuring means and said first and second tap changing means, respectively, for controlling the operation of said tap changing means in response to the voltage of said load circuit, second and third means connected in circuit relation with said first and second sources, respectively, for obtaining a measure of the first and second load currents flowing from said sources to said load circuit, and a pair of first and second reactances connected in circuit relation between each of said first and second voltage responsive means and said voltage measuring means, the values of said first and second reactances being proportioned substantially inversely to the desired ratio of reactive load currents supplied from said first and second sources, respectively, said second and third means being connected in circuit relation with each of said first and second reactances, respectively, for circulating currents therethrough and for producing corresponding opposing voltages across the reactances of each pair which vary with the first and second load currents, respectively, the differences between the voltages across each pair of reactances being additive and subtractive, respectively, with respect to the voltage applied to said first and second voltage responsive means, respectively.

11. In an electric power system including a plurality of interconnected alternating current electric power circuits each having a line current and a voltage associated therewith, the combination comprising, a voltage responsive device connected in circuit relation with a first of said circuits to be responsive to the voltage of the latter circuit, a line drop compensating circuit including a resistive component and a reactive component proportional to the resistance and to the reactance, respectively, of a portion of said first circuit, said compensating circuit being connected between said voltage responsive device and said first circuit, means for circulating a current through said compensating circuit proportional to the line current of said first circuit for producing a voltage across said compensating circuit which varies with the voltage across said portion of said first circuit, an impedance connected in series with said compensating circuit and said voltage responsive device and said first circuit and means for circulating a current through said impedance which varies with the line current in a second of said circuits and for producing a corresponding voltage across said impedance.

No references cited.